United States Patent [19]
Leigh-Monstevens et al.

[11] Patent Number: 5,094,079
[45] Date of Patent: * Mar. 10, 1992

[54] MASTER CYLINDER ASSEMBLY

[75] Inventors: Keith V. Leigh-Monstevens, Troy; Brian D. Mabee, Warren, both of Mich.

[73] Assignee: Automotive Products plc, Warwickshire, England

[*] Notice: The portion of the term of this patent subsequent to Apr. 24, 2007 has been disclaimed.

[21] Appl. No.: 410,349

[22] Filed: Sep. 21, 1989

Related U.S. Application Data

[63] Continuation-in-part of Ser. No. 111,294, Oct. 22, 1987, Pat. No. 4,918,921, and Ser. No. 408,575, Sep. 14, 1989, Pat. No. 5,002,166.

[51] Int. Cl.⁵ .................................... F15B 7/00
[52] U.S. Cl. ................................. 60/545; 60/538; 192/3.58; 192/83
[58] Field of Search ............... 60/538, 545; 192/83, 192/84 R, 3.58, 3.63

[56] References Cited

U.S. PATENT DOCUMENTS

| | | | |
|---|---|---|---|
| 4,275,804 | 6/1981 | Szarka et al. | 192/3.58 |
| 4,280,604 | 7/1981 | Lambicco | 192/0.08 |
| 4,395,883 | 8/1983 | Melinat | 60/545 |
| 4,531,419 | 7/1985 | Botz et al. | 60/545 X |
| 4,576,417 | 3/1986 | Dobner | 60/545 X |
| 4,685,062 | 8/1987 | Uriuhara et al. | 192/3.58 X |
| 4,812,723 | 3/1989 | Shimizu | 60/545 X |
| 4,852,419 | 8/1989 | Kittel et al. | 74/89.14 |
| 4,858,436 | 8/1989 | Brusasco | 60/545 |
| 4,918,921 | 4/1990 | Leigh et al. | 60/545 |
| 4,971,183 | 11/1990 | Tellert | 192/3.63 X |
| 5,002,166 | 3/1991 | Leigh et al. | 60/567 X |

FOREIGN PATENT DOCUMENTS

| | | |
|---|---|---|
| 2440039 | 7/1983 | Fed. Rep. of Germany . |
| 1136072 | 5/1957 | France .................... 60/545 |
| 8702583 | 2/1987 | France . |
| 18131 | 2/1978 | Japan ..................... 192/3.58 |
| 83618 | 6/1980 | Japan ..................... 192/3.58 |
| 1459419 | 12/1976 | United Kingdom . |
| 2041481 | 9/1980 | United Kingdom . |
| 2117076 | 10/1983 | United Kingdom ...... 192/84 R |

OTHER PUBLICATIONS

Bendix Hydro-Max Power Brake brochure.
Alfred Teves booster literature.
Automotive Products power hydraulic booster literature.
*Popular Science*, Mar. 1988 issue, pp. 64-65.

*Primary Examiner*—Edward K. Look
*Assistant Examiner*—Todd Mattingly
*Attorney, Agent, or Firm*—Krass & Young

[57] ABSTRACT

A master cylinder assembly and a motor vehicle power assist actuator utilizing the master cylinder assembly. In one form of the invention, a clutch actuator is provided in which the clutch may be actuated in the usual manner by depression of the clutch pedal to move the piston in the master cylinder assembly under the urging of the push rod or, in a power mode of the actuator, movement of the gear shift lever of the vehicle is sensed by a logic module whereupon the electric motor of the master cylinder assembly is energized in a sense to move the ball screw to apply a power assist force to the annular outer periphery of the rear end of the piston and thereby effect disengagement of the clutch. In another embodiment of the invention, the signal to the logic module to enable energization of the motor is generated by a switch connected to the clutch pedal so that the force for disengaging the clutch includes a manual force applied by the push rod and a power force applied by a ball screw. In a further embodiment of the invention, the master cylinder assembly is utilized in a power assist brake actuator wherein a proportional potentiometer senses the pivotal movement of the brake pedal and provides a power assist, via the logic module, to the ball screw that is proportional to the extent of pivotal movement of the brake pedal.

12 Claims, 2 Drawing Sheets

MASTER CYLINDER ASSEMBLY

RELATED APPLICATION

This application is a continuation-in-part of U.S. patent application Ser. No. 111,294 filed on Oct. 22, 1987, now U.S. Pat. No. 4,918,921, and Ser. No. 408,575 filed on Sept. 14, 1989, now U.S. Pat. No. 5,002,166.

BACKGROUND OF THE INVENTION

Master cylinders are in wide use in various industries, but particularly in the motor vehicle industry where they serve in conjunction with an associated slave cylinder to control various systems of the motor vehicle. For example, the brakes of a motor vehicle are typically actuated by slave cylinders located at the wheels of the vehicle and supplied with pressure fluid from a master cylinder actuated by the brake pedal of the vehicle. As a further example, the clutch of a manual transmission vehicles is often engaged and disengaged by a slave cylinder located at the clutch assembly and receiving pressure fluid from a master cylinder actuated by the clutch pedal of the vehicle. In both of the above examples, the master cylinder is directly and manually actuated by the vehicle operator by suitable actuation of the associated control pedal of the vehicle. Whereas manual actuation of a master cylinder is effective to produce the desired resultant action at the associated slave cylinder, there are situations where it would be desirable to provide power operation of the master cylinder as suitably instigated by the vehicle operator. For example, such a power operated master cylinder would be useful in a manual transmission vehicle to engage and disengage the vehicle clutch in response to a suitable signal from the vehicle operator.

SUMMARY OF THE INVENTION

This invention is directed to the provision of an improved master cylinder assembly.

More particularly, this invention is directed to the provision of a power operated master cylinder assembly especially suitable for use in engaging and disengaging the clutch of a manual transmission motor vehicle or in applying the brakes of a motor vehicle.

This invention is further directed to the provision of an improved clutch actuator for a manual transmission motor vehicle.

This invention is further directed to the provision of an improved brake actuator for a motor vehicle.

The master cylinder assembly of the invention includes a cylinder housing defining a bore; a piston mounted for reciprocal movement in the bore; an actuator member extending into one end of the bore for pushing engagement with the piston so that axial movement of the actuator member moves the piston axially in the bore; power drive means operative when actuated to move the actuator axially and thereby move the piston axially in the bore; and a push rod extending at one end thereof into the one end of the bore for pushing engagement with the piston so that, with the other end of the push rod connected to a control pedal of the vehicle, the piston may be moved axially in the bore by the push rod independently of the movement of the actuator member by the power means. This arrangement provides a simple and effective master cylinder assembly providing either a direct manual displacement of the master cylinder piston, power displacement of the master cylinder piston, or displacement of the master cylinder piston under the combined effect of the manually actuated push rod and the power means.

According to a further feature of the invention, the power drive means comprises a motor and a nut driven by the motor and the actuator member comprises a screw threadably driven by the nut. This arrangement provides a convenient and effective means of providing power actuation to the piston of the master cylinder.

According to a further feature of the invention, the screw is annular and pushingly engages an annular outer surface of the end face of the piston and the push rod passes through the screw for pushing engagement with a central portion of the piston end face. This specific arrangement allows convenient and direct pushing access to the piston for both the power operated actuator member and the manual push rod.

According to a further feature of the invention, the motor comprises an electric motor having its output shaft mounted for rotation about an axis parallel to but offset laterally from the axis of the bore of the master cylinder, and the power drive means further includes gear means interconnecting the output shaft of the motor and the nut. This arrangement provides an extremely compact package for a power assisted master cylinder assembly.

According to a further feature of the invention, the nut is a ball nut and the screw is a ball screw. This specific arrangement facilitates the efficient operation of the power assist means.

The invention also discloses an improved clutch actuator for use with a motor vehicle of the type including a manual gearbox, a shift lever member for shifting the gears of the gearbox, a clutch, and a clutch pedal. The invention clutch actuator includes a master cylinder assembly including a cylinder defining a bore open at its rear end and closed at its front end, a piston mounted for reciprocal movement in the bore and including a rear end and a front end coacting with the closed front end of the bore to define a pressure chamber therebetween, a discharge port proximate the closed end of the bore and communicating with the pressure chamber, and a push rod extending into the bore for direct pushing engagement at one end thereof with the rear end of the piston and adapted to be secured at its other end to the clutch pedal so that depression of the clutch pedal moves the piston in the bore to discharge pressure fluid from the pressure chamber through the discharge port; a slave cylinder adapted to be mounted proximate the clutch and including an inlet port receiving the pressure fluid from the master cylinder assembly; and power means operative in response to movement of one of the clutch pedal or shift lever members to apply a force to the rear end of the piston independent of any force applied thereto by the push rod. This arrangement provides a compact and inexpensive clutch actuator which may be manually actuated, power actuated, or actuated by a combined manual force and power force.

In one embodiment of the invention clutch actuator, the member that is moved to actuate the power means is the gear shift lever and in another embodiment of the invention the member that is moved to actuate the power means is the clutch pedal.

The invention also discloses an improved power assist brake actuator for a motor vehicle in which a push rod secured to the brake pedal extends into the bore of the master cylinder for direct pushing engagement with the rear end of the piston of the master cylinder and power means are provided which are operative in response to depression of the brake pedal to apply a power assist force to the rear end of the piston independent of any manual force applied thereto by the push rod. This arrangement provides a simple, compact, and effective power assist arrangement for a brake actuator.

DETAILED DESCRIPTION OF THE PREFERRED EMBODIMENTS

Figure 1:
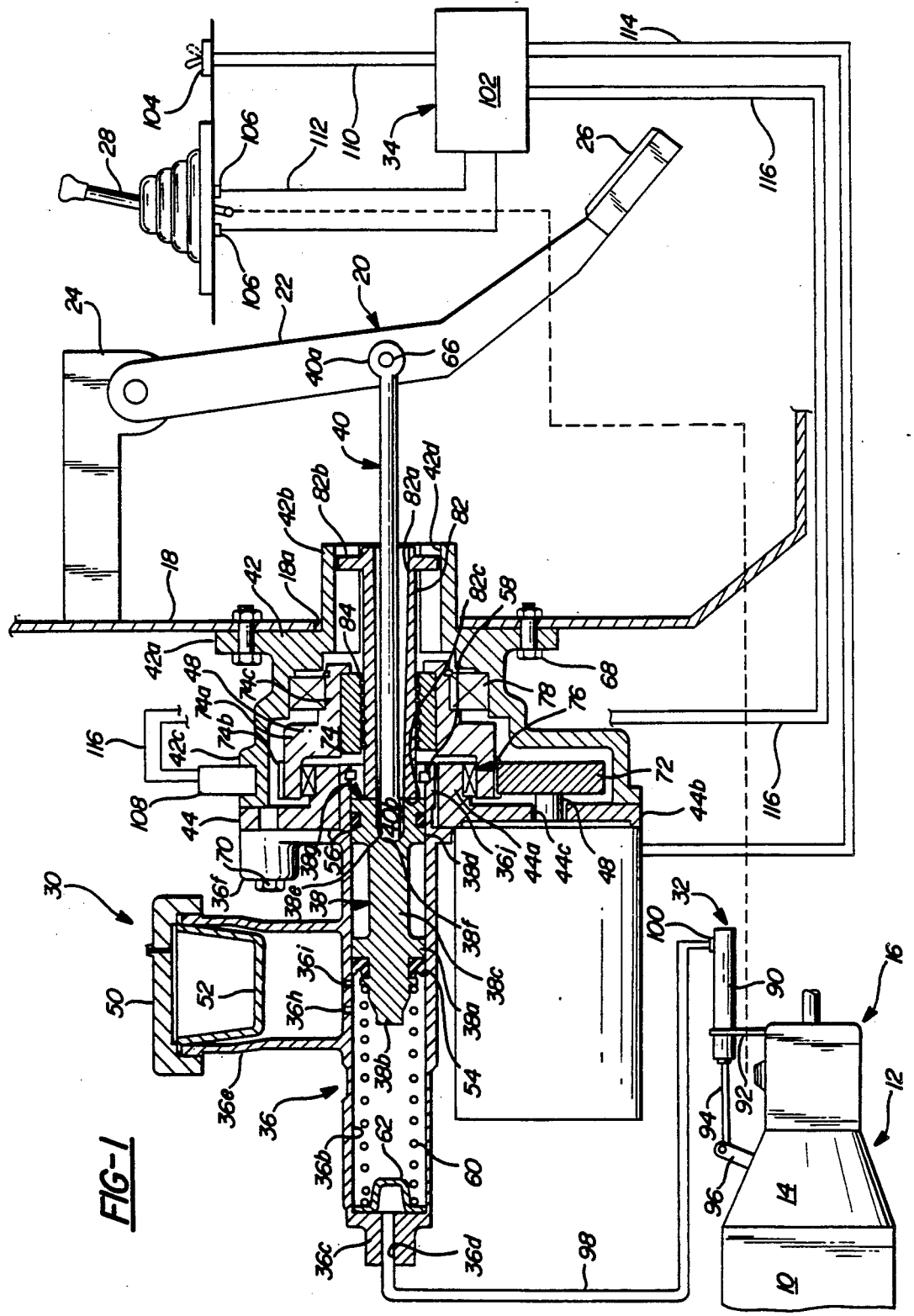
FIG. 1 is a somewhat schematic view of a clutch actuator embodying the invention master cylinder assembly.

The invention clutch actuator and master cylinder assembly are seen in FIG. 1 in association with a motor vehicle of the type including an engine 10, a clutch 12 including a clutch bell housing 14, a transmission or gearbox 16, a fire wall 18, a clutch pedal 20 including a pedal arm 22 pivotally mounted at its upper end to a bracket 24 suitably secured to a fire wall 18 and further including a pedal pad 26 mounted on the lower end of arm 22, and a gear shift lever 28 engaging the shift rails of gearbox 16 and operative in known manner in response to shifting movement of the lever to shift the gearbox between its various gear ratios.

The invention clutch actuator as seen in FIG. 1 includes a master cylinder assembly 30, a slave cylinder 32, and a control means 34.

Master cylinder assembly 30 includes a cylinder housing 36, a piston 38, a push rod 40, a power housing 42, an adapter plate 44, an electric motor 46, and drive means 48.

Cylinder housing 36 may be formed, for example, of a suitable plastic material and includes a main body portion 36a defining an elongated bore 36b which is open at its rear end and closed at its forward end by an end wall 36c defining a central discharge port 36d. Cylinder housing 36 further includes an integral reservoir housing 36e and a mounting flange portion 36f proximate the front end of main body portion 36a. A reservoir cap 50 closes the upper end of the reservoir and a diaphragm 52 is positioned within the reservoir.

Piston 38 may also be formed of a plastic material and is mounted for reciprocal movement in cylinder bore 36b. Piston 38 includes a front land portion 38a defining an annular groove receiving an annular seal 54, a nose portion 38b, a spool portion 38c, and a rear land portion 38d defining an annular groove for receipt of an annular seal 56. A socket 38e having a concave blind end wall 38f is provided in the rear end face 38g of the piston. A snap ring 58 received in the rear end of bore 36b limits the rearward movement of piston 38 in bore 36b and a coil spring 60 extends between the front end of the piston and the housing end wall 36c. Spring 60 is mounted at its rear end over piston nose portion 38b and is positioned at its front end on a spring retainer 62 positioned against housing end wall 36c. The front end of the piston coacts with the end wall 36c of the cylinder housing to define a pressure chamber 64 therebetween and a pair of spaced ports 36h and 36i between the reservoir and the pressure chamber 64 coact in known manner with the piston as the piston moves reciprocally in bore 36b to isolate the reservoir from the pressure chamber or to provide replenishing fluid to the pressure chamber as required.

Push rod 40 is secured at its rear end 40a to clutch pedal arm 22 by a pivot pin 66 and is positioned at its forward end 40b in piston socket 38e for pushing engagement with blind end surface 38f so that depression of the pedal arm 22 by operator actuation of pedal pad 26 moves piston 38 in bore 36b to discharge pressure fluid from pressure chamber 64 through discharge port 36d.

Power housing 42 is adapted to be secured to the engine side of fire wall 18 and includes a flange portion 42a adapted to receive bolts 68 to secure the power housing to the fire wall 18, a central guide or hub portion 42b passing rearwardly through an aperture 18a in fire wall 18, and a main body gear housing portion 42c extending forwardly from flange portion 42a and open at its forward end.

Adapter plate 44 is sandwiches between cylinder housing mounting flange portion 36f and the front end of main body portion 42c of power housing 42 and includes a central hub portion 44a piloted over the portion 36j of cylinder housing main body portion 36a rearwardly of flange portion 36f. Bolts 70 secure cylinder housing mounting flange 36f to adapter plate 44 and further bolts (not shown) secure power housing 42 to adapter plate 44.

Electric motor 46 is a 12v direct current variable speed motor of known form. Motor 46 is secured to the front face of the lower portion 44b of adapter plate 44 and includes a central output shaft 48 passing through an aperture 44c in the lower portion 44b of adapter plate 44 to position the rear end of output shaft 48 within the power housing 42.

Drive means 48 includes a pinion or planet gear 72 secured to the free end of motor output shaft 48 and a central or sun gear 74. Central gear 74 includes a forward annular flange portion 74a defining gear teeth 74b for engagement with pinion gear 72 and a rear hub portion 74c. Gear flange portion 74a is journaled on a bearing 76 carried by hub portion 44a of adapter plate 44 and gear hub portion 74c is journaled by a bearing 78 carried by power housing main body portion 42c. Drive means 48 further includes a ball nut 80 fixedly positioned within the hollow of gear hub portion 74c and a ball screw 82 threadably received within ball nut 80 with balls 84 received in coacting helical grooves defined in the ball nut and ball screw respectively to provide axial movement of the ball screw in response to rotation of the ball nut in known manner.

Ball screw 82 has a hollow tubular configuration and defines a through passage or bore 82a extending from the front to the rear of the ball screw and passing push rod 40 so as to enable the front end 40b of push rod 40 to be received against socket blind end wall 38f. Antirotation pins 82b are provided proximate the rear end of ball screw 82 for coaction with slots 42d defined by power housing hub portion 42b to preclude rotation of the ball screw and thereby ensure axial movement of the ball screw in response to rotation of the ball nut. The front annular end 82c of ball screw 82 extends into the open rear end of bore 36b and is arranged to move into direct abutting pushing relation to the annular outer surface of the rear end 38g of piston 38 in concentric surrounding relation to push rod 40 so that the push rod 40 pushingly accesses the central portion of piston rear end wall or face 38g and the annular end face 82c of the ball screw pushingly accesses the outer surface of the rear end wall 38g of the piston. The ball screw 82 and push rod 40 may thus pushingly act against the rear end of the piston independently of each other or in combination with each other.

Slave cylinder assembly 32 is of known form and includes a cylinder housing 90 secured to gearbox 16, as by a bracket 92, and an output push rod 94 pivotally connected at its free end to the outer end of a release lever 96 extending through an opening in clutch bell housing 14 for connection to the clutch release bearing so that pivotal movement of release lever 96 in response to extension of push rod 94 operates to release or disengage the clutch and opposite pivotal movement of the release lever 96 occurs in response to reengagement of the clutch under the influence of the diaphragm spring fingers of the clutch.

A conduit 98 interconnects the discharge port 36d of master cylinder 30 and the inlet 100 of slave cylinder 90 so that reciprocal movement of piston 38 within master cylinder bore 36b in response to either pushing actuation by push rod 40 or pushing actuation by ball screw 82 results in the delivery of pressurized fluid from pressure chamber 64 through discharge port 36d and through conduit 98 to slave cylinder 90 to extend slave cylinder output rod 94 and disengage the clutch.

Control means 34 includes a logic module 102, a mode selector switch 104, switch means 106 associated with shift lever 28, and a position sensor 108, which may for example be of the Hall effect type, positioned exteriorly of the power housing main body portion 42c in confronting relation to the teeth 74b on gear 74. Leads 110 connect mode selector switch 104 to logic module 102; leads 112 connect gear shift lever switch means 106 to logic module 102; leads 114 connect motor 46 to logic module 102; and leads 116 connect position sensor 108 to logic module 102.

Mode selector switch 104 is movable between a solid line manual position as seen in FIG. 1 in which the logic module is disabled, thereby disabling electric motor 46, and a dotted line power position as seen in FIG. 1 in which the logic module 102 is enabled so as to enable the motor 46 and the associated drive means. With the mode selector switch in the solid line or manual position of FIG. 1, clutch engagement and disengagement is effected in the usual manner by manual depression of clutch pedal 20 with push rod 40 acting directly against piston 38 to move the piston axially within bore 36b and discharge pressure fluid from pressure chamber 64 through discharge port 36d for delivery to slave cylinder 90 through conduit 98 to effect disengagement of the clutch with the reengagement of the clutch being effected by the diaphragm spring fingers of the clutch upon operator release of the clutch pedal.

With the mode select switch 104 in the dotted line or power position of FIG. 1, the clutch is disengaged and engaged automatically without driver operation of the clutch pedal. Specifically, upon movement of the shift lever 28 to achieve a new gear ratio of gear box 16, switch means 106 functions to signal logic module 102 that a shift is being attempted and logic module 102 in turn signals electric motor 46 via leads 114 to energize the motor so as to rotate gear 72 and thereby gear 74 in a sense to move ball screw 82 to the left as viewed in FIG. 1 and thereby move piston 38 to the left as viewed in FIG. 1 to discharge pressure fluid from pressure chamber 64 through discharge port 36d and through conduit 98 to slave cylinder 90 to disengage the clutch. The extent of energization of electric motor 46 necessary to effect full disengagement of the clutch is measured by position sensor 108 which effectively counts the teeth 74b moving past the sensor and, upon the passage of a predetermined number of teeth corresponding to full clutch disengagement, deenergizes the motor since full clutch disengagement has been achieved. Upon the arrival of the gear shift lever at the new shift position, switch means 106 functions to signal logic module 102 that the shift has been completed, whereupon logic module 102 again signals motor 46 and energizes the motor in the opposite sense to the original energization so that ball screw 82 is moved to the right as seen in FIG. 1 to allow the piston 38 to move to the right under the urging of the clutch diaphragm spring fingers and return the piston to its starting position in bore 36b with the extent of rightward movement of ball screw 82 again being determined by position sensor 108. Specifically, sensor 108 counts the number of gear teeth 74b passing by the sensor and signals the logic module 102 when the required number of gear teeth, corresponding to full reengagement of the clutch, have passed the sensor, whereupon the logic module functions to deengerize motor 46.

Figure 2:
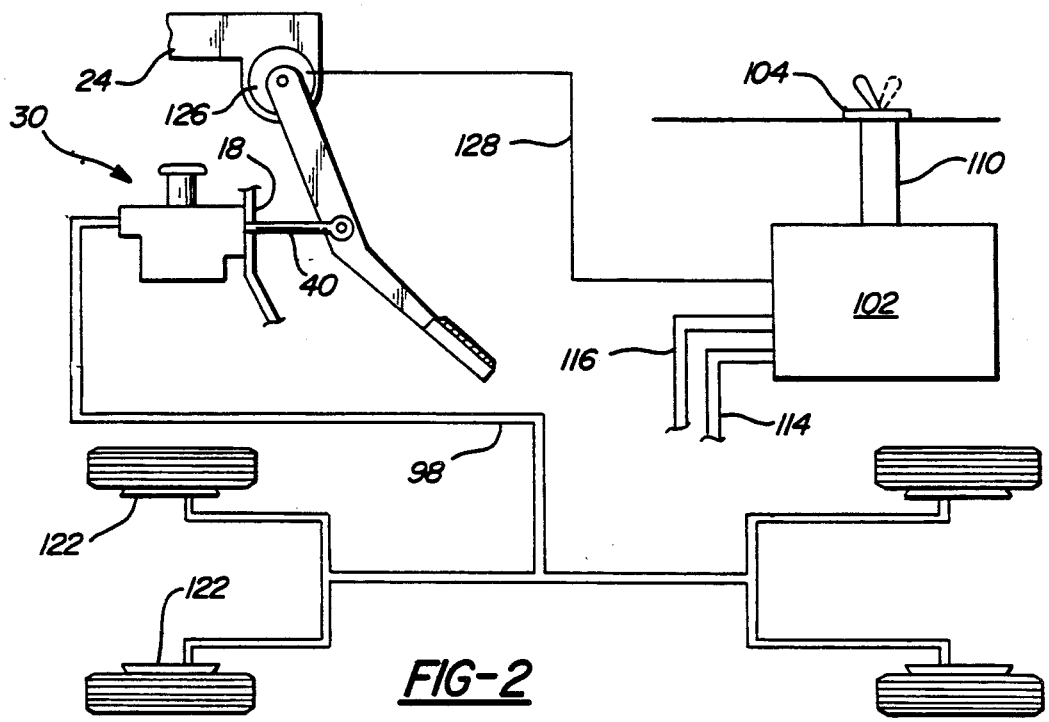
FIG. 2 is a fragmentary view of a brake actuator according to the invention.

The brake actuator as shown diagrammatically and fragmentarily in FIG. 2 is generally similar to the clutch actuator shown in FIG. 1 with the exception that the energization of the power assist means of the master cylinder assembly is controlled by movement of the vehicle brake pedal 120 rather than by movement of the gear shift lever, and the pressurized fluid delivered to conduit 98 is distributed in known manner to slave cylinders (not shown) forming part of drum or disk brake assemblies 122 located at the four-wheels 124 of the associated vehicle.

Specifically, a proportional potentiometer 126 is positioned at the upper end of brake pedal arm 120 and functions to measure the extent of pivotal movement of the pedal arm and provide a signal through a lead 128 to logic module 102 representative and proportional to the extent of pivotal movement of the brake pedal 120. With the mode select switch 104 in the solid line or logic module disenable position, braking is accomplished in the usual manner by depression of brake pedal 120 to move push rod 40 pushingly against the rear end of piston 38 and thereby discharge pressure fluid from pressure chamber 64 for delivery to the wheel slave cylinders through conduit 98.

With mode select switch 104 in the dotted line or logic module enable position, as the operator depresses the brake pedal to initiate a braking action, potentiometer 126 functions to transmit a signal through lead 128 to logic module 102 which functions upon receipt of the signal through lead 128 to energize motor 46 in a sense to drive ball screw 82 to the left (as viewed in FIG. 1) so that the ball screw pushingly engages the annular outer surface of the rear end 38g of the piston to augment the force applied to the central portion of the piston by the push rod 40 so that the force applied to the piston 38 to effect the vehicle braking action comprises a combined force consisting of the manual force supplied by the operator through push rod 40 and a power assist force applied from motor 46 via ball screw 82. Since potentiometer 120 is a proportional potentiometer, the signal transmitted to logic module 102 varies directly in proportion to the extent of pivotal movement of brake pedal 120. Logic module 102, upon receipt of an increasing magnitude signal from potentiometer 120, in response to increasing movement of brake pedal 120, functions to signal motor 46 in a sense to progressively increase the speed of the motor so that the power assist provided by the motor, as imparted to the piston 38 by ball screw 82, increases with increasing pivotal movement of the brake pedal so that the greater the braking signal initiated by the operator, as measured by the extent of pivotal movement of pedal arm 120, the greater the amount of power assist that is provided by the motor and associated screw mechanism. Unlike the system of FIG. 1 wherein the energization of the power means is continued for a time as measured by the passage of a specified number of teeth on the gear 74, the energization of the motor, and thereby the power assist, is continued in the brake actuator embodiment of FIG. 2 only for so long as the brake pedal lever is maintained in an actuated or pivoted position. Once the operator has released the brake pedal to allow the brake pedal to move back toward its rest position, the logic module functions to reverse the motor so as to move ball screw 82 to the right (as viewed in FIG. 1) and allow the piston of the master cylinder assembly to return to its rest position.

Figure 3:
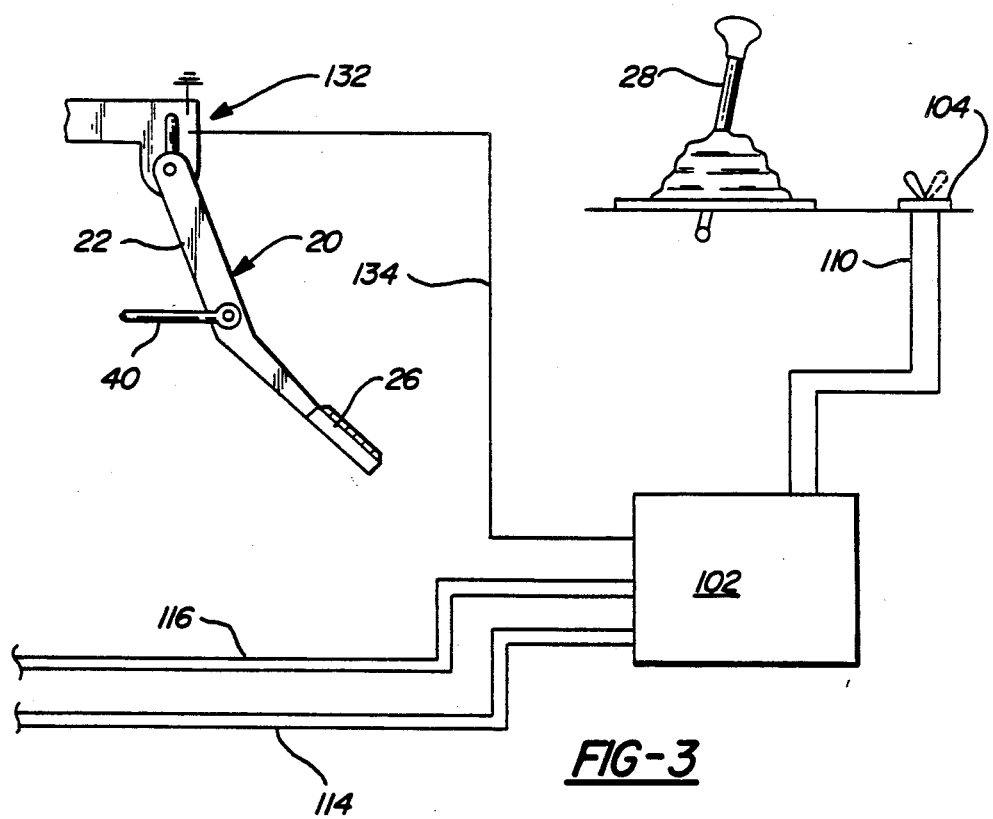
FIG. 3 is a fragmentary view of a modified form of clutch actuator according to the invention.

The clutch actuator of FIG. 3 is identical to the clutch actuator of FIG. 1 with the exception that, in the power mode of the actuator, the signals to the logic module 102 to energize or deenergize motor 46 to effect clutch disengagement or allow clutch reengagement are generated in response to movement of the clutch pedal rather than in response to movement of the gear shift lever.

Specifically, clutch disengagement in the manual mode is effected in known manner by operator depression of lever 22 to move push rod 40 against piston 38 and deliver pressurized fluid to slave cylinder 32 to disengage the clutch. With mode selector switch 104 in its dotted line or power position, as clutch lever 22 is pivoted in response to operator actuation of the clutch pedal, a switch 132 positioned proximate the upper end of lever 22 is closed to send a signal through a lead 134 to logic module 102 to energize motor 46 in a sense to move screw 82 to the left (as viewed in FIG. 1) so that movement of piston 38 to the left to effect disengagement of the clutch is achieved as a combined manual and power force including a manual force generated by push rod 40 acting at the center of the rear end 38g of the piston and a power force generated by screw 82 acting at the annular outer periphery of piston rear 38g. As with the FIG. 1 embodiment, energization of motor 46 continues until logic module 102 receives a signal through lead 134 from position sensor 108 indicating that full clutch disengagement has been achieved, whereupon the motor is deenergized. As the operator thereafter releases the clutch pedal to achieve clutch reengagement under the influence of the clutch diaphragm fingers, switch 132 opens to signal logic module 102 through lead 13 to energize motor 46 in a sense to retract screw 82 and allow the movement of the clutch to its disengaged position with the deenergization of the motor again be effected by logic module 102 in response to a suitable signal from position sensor 108.

The invention will be seen to provide an improved master cylinder assembly suitable for use in various motor vehicle control systems such for example as clutch actuators or vehicular braking systems. The invention master cylinder assembly provides efficient operation in a extremely compact package and allows either manual movement of the piston of the master cylinder by the operator, power movement of the piston by an associated power means, or movement of the piston under a combined manual and power source.

We claim:

1. A master cylinder assembly for use with a control pedal of a motor vehicle, said assembly comprising:
    a cylinder housing defining a bore;
    a piston mounted for reciprocal movement in said bore;
    a push rod extending coaxially of the bore at one end thereof into said one end of said bore for pushing engagement with one end face of said piston so that with the other end of said push rod connected to a control pedal of the vehicle said piston may be moved axially in said bore by said push rod;
    a tubular actuator member concentric with the push rod and extending into one end of said bore for pushing engagement with said one end face of said piston so that axial movement of said actuator member moves said piston axially in said bore; and
    power drive means operative when actuated to move said actuator member axially and thereby move said piston axially in said bore independently of the movement of said actuator member by said push rod;
    said power drive means comprising a motor and a nut driven by said motor;
    said actuator member having a screw thread thereon driven by said nut and pushingly engaging an annular outer surface of said end face of said piston with said push rod passing through said actuator member for pushing engagement with a central portion of said piston end face.

2. A master cylinder assembly according to claim 1 wherein:
    said motor comprises an electric motor having its output shaft mounted for rotation about an axis parallel to but offset laterally from the axis of said bore; and
    said power drive means further includes gear means drivingly interconnecting said motor output shaft and said nut.

3. A master cylinder assembly according to claim 2 wherein:
    said nut is a ball nut and said screw is a ball screw.

4. A master cylinder assembly for use with a control pedal of a motor vehicle, said assembly comprising:
    a cylinder housing defining a bore having a central axis;
    a piston mounted for reciprocal movement in said bore along said axis;
    an externally threaded tubular member mounted for reciprocal movement on said axis and adapted to pushingly engage an end face of said piston;
    a push rod adapted to be connected at one end thereof to the motor vehicle control pedal and extending through said tubular member for pushing engagement at its other end with said end face of said piston;
    a nut threadably passing said tubular member; and
    power means operative when actuated to rotate said nut and thereby move said tubular member along said axis.

5. A master cylinder assembly according to claim 4 wherein:
    said power means comprises an electric motor and drive means drivingly connecting said motor to said nut.

6. A master cylinder assembly according to claim 5 wherein:

said electric motor includes an output shaft mounted for rotation on an axis parallel to but laterally offset from said bore axis; and said drive means comprises a gear train drivingly interconnecting said motor output shaft and said nut.

7. A master cylinder assembly according to claim 6 wherein:

said nut comprises a ball nut and said tubular member comprises a hollow ball screw.

8. A clutch actuator for use with a motor vehicle of the type including a manual gear box, a shift lever member for shifting the gears of the gear box, a clutch, and a clutch pedal member, said actuator including:

a master cylinder assembly including a cylinder defining a bore open at its rear end and closed at its front end, a piston mounted for reciprocal movement in said bore and including a rear end and a front end coacting with said closed front end of said bore to define a pressure chamber therebetween, a discharge port proximate said closed end of said bore and communicating with said pressure chamber, and a push rod extending into said bore for direct pushing engagement at one end thereof with said rear end of said piston and adapted to be connected at its other end to the clutch pedal so that depression of the clutch pedal moves said piston in said bore to discharge pressure fluid from said pressure chamber through said discharge port;

a slave cylinder adapted to be mounted proximate the clutch and including an inlet port receiving the pressure fluid from said pressure chamber;

power means operative in response to movement of said clutch pedal member to apply a force to said rear end of said piston independently of any force applied thereto by said push rod;

said power means comprising an electric motor and drive means drivingly interconnecting said electric motor in said piston;

a nut driven by said electric motor; and a hollow screw driven by said nut, pushingly engaging an annular outer surface on said rear end of said piston, and centrally passing said push rod to allow said push rod to pushingly engage a central surface on said rear end of said piston.

9. A clutch actuator for use with a motor vehicle of the type including a manual gear box, a shift lever member for shifting the gears of the gear box, a clutch, and a clutch pedal member, said actuator including:

a master cylinder assembly including a cylinder defining a bore open at its rear end and closed at its front end, a piston mounted for reciprocal movement in said bore and including a rear end and a front end coacting with said closed front end of said bore to define a pressure chamber therebetween, a discharge port proximate said closed end of said bore and communicating with said pressure chamber, and a push rod extending into said bore for direct pushing engagement at one end thereof with said rear end of said piston and adapted to be connected at its other end to the clutch pedal so that depression of the clutch pedal moves said piston in said bore to discharge pressure fluid from said pressure chamber through said discharge port;

a slave cylinder adapted to be mounted proximate the clutch and including an inlet port receiving the pressure fluid from said pressure chamber; and power means operative in response to movement of said shift lever member to apply force to said rear end of said piston independent of any force applied thereto by said push rod.

10. An actuator according to claim 9 wherein:

said power means comprises an electric motor and drive means drivingly interconnecting said electric motor and said piston.

11. An actuator according to claim 10 wherein:

said drive means comprises a nut driven by said electric motor and a hollow screw driven by said nut, pushingly engaging an annular outer surface on said rear end of said piston, and centrally passing said push rod to allow said push rod to pushingly engage a central surface on said rear end of said piston.

12. A brake actuator for use with a motor vehicle of the type including a braking system including a brake pedal for operator actuation, said actuator including:

a master cylinder assembly including a cylinder defining a bore open at its rear end and closed at its front end, a piston mounted for reciprocal movement in said bore and including a rear end and a front end coacting with said closed front end of said bore to define a pressure chamber therebetween, a discharge port proximate said closed end of said bore and communicating with said pressure chamber, and a push rod extending into said bore for direct pushing engagement at one end thereof with said rear end of said piston and adapted to be connected at its other end to the clutch pedal so that depression of the clutch pedal moves said piston in said bore to discharge pressure fluid from said pressure chamber through said discharge port;

a slave cylinder adapted to be mounted proximate the braking assembly located at a wheel of the vehicle and including an inlet port receiving the pressure fluid from said pressure chamber; and power means operative in response to depression of said brake pedal to apply a force to said rear end of said piston independently of any force applied thereto by said push rod;

said power means comprising an electric motor and drive means interconnecting said electric motor and said piston;

said drive means comprising a nut driven by said electric motor and a hollow screw driven by said nut, pushingly engaging an annular outer surface on said rear end of said piston, and centrally passing said push rod to allow said push rod to pushingly engage the central surface on said rear end of said piston.

* * * * *